United States Patent [19]
Steiner et al.

[11] Patent Number: 5,564,797
[45] Date of Patent: Oct. 15, 1996

[54] METHOD FOR OPTIMIZING TRIGGERING OF AN AUTOMATIC BRAKING PROCESS

[75] Inventors: Manfred Steiner, Winnenden; Wolfgang Kiesewetter, Waiblingen; Werner Reichelt, Esslingen; Christoph Steffi, Backnang; Joachim Nell, Ostfildern; Siegfried Rump, Weinstadt; Brian Douglas, Stuttgart, all of Germany

[73] Assignee: Mercedes-Benz AG, Germany

[21] Appl. No.: 283,916

[22] Filed: Aug. 3, 1994

[30] Foreign Application Priority Data

Aug. 3, 1993 [DE] Germany .......................... 43 25 940.5

[51] Int. Cl.$^6$ ........................................ B60T 7/12
[52] U.S. Cl. ................. 303/113.4; 303/176; 303/191
[58] Field of Search ................. 303/93, 100, 113.4, 303/125, 135, 176, 191; 188/353; 364/426.02, 426.01

[56] References Cited

U.S. PATENT DOCUMENTS

| | | | |
|---|---|---|---|
| 5,158,343 | 10/1992 | Reichelt et al. | ............ 303/113.4 |
| 5,230,549 | 7/1993 | Osada et al. | ............ 303/113.4 X |
| 5,261,730 | 11/1993 | Steiner et al. | ............ 303/113.4 |

FOREIGN PATENT DOCUMENTS

| | | | |
|---|---|---|---|
| 4028290.2 | 5/1991 | Germany . | |
| 4028290 | 1/1992 | Germany . | |
| 4151357 | 5/1992 | Japan | ............ 303/113.4 |
| 2265195 | 9/1993 | United Kingdom . | |

*Primary Examiner*—Robert J. Oberleitner
*Assistant Examiner*—Peter M. Poon
*Attorney, Agent, or Firm*—Evenson, McKeown, Edwards & Lenahan, P.L.L.C.

[57] ABSTRACT

A method is provided for determining the start and the end of an automatic braking process to optimize the triggering of the automatic braking process. When a set value is exceeded, an automatic braking process is triggered. The threshold value is changed as a function of the driving state, in particular, as a function of the speed of the vehicle when the brake pedal is actuated, and independently thereof, as a function of the position of the brake pedal. In addition, various criteria terminate the automatic braking process as a function of the actuation force of the brake pedal, of the speed of the vehicle and of the pedal travel.

25 Claims, 4 Drawing Sheets

METHOD FOR OPTIMIZING TRIGGERING OF AN AUTOMATIC BRAKING PROCESS

BACKGROUND AND SUMMARY OF THE INVENTION

The present invention relates to a method for determining the start and the end of an automatic braking process while a vehicle is being braked in order to optimize triggering of the automatic braking process.

A basic method for shortening the braking path in critical driving situations is described in DE 40 28 290 C1, in which an automatic braking process is triggered when the actuation speed of the brake pedal exceeds a threshold value. Directly after the automatic braking process is triggered, a brake pressure is built up which is greater than that which results from the position of the brake pedal. Thereafter, an emergency situation is detected and shortening of the braking path is brought about.

The earlier the triggering of the automatic braking process, the greater the shortening of the braking path achieved during the process, in particular because the vehicle braking path is mainly determined by the deceleration at the start of the braking process when the vehicle is at maximum speed. However, the emergency braking must not be triggered too early since unexpectedly violent braking outside emergency situations can startle the driver and cause him or her to experience reactions of panic and fright which are inappropriate for the situation. in addition, violent braking in traffic situations which do not require such braking may surprise the drivers of vehicles travelling behind so that they no longer react correctly and may drive into the vehicle travelling ahead.

For these reasons, when fixing the threshold value a compromise must be made between the earliest possible triggering, that is to say low threshold value, and avoiding unnecessary triggering, that is to say a high threshold value.

An object of the present invention is to optimize the triggering of the automatic braking process.

This object has been achieved according to the present invention by providing that a threshold value used as the criteria for triggering the automatic braking process is determined by multiplying a fixed threshold value by at least one factor which is a function of a driving state variable.

Furthermore, although a fixed threshold value is specified, this threshold value is matched to different driving situations by being multiplied by one or more factors. For this purpose, the at least one factor is determined as a function of a variable which represents the driving state of the vehicle. The variables which represent the driving state are to be understood here to include not only physical variables which characterize the movement of the vehicle but also control elements which can be actuated by the driver and influence the movement behavior of the vehicle. Information on the fixed threshold value and on the automatic braking process can be found in aforementioned DE 40 28 290 C1.

In accordance with one embodiment of the invention one factor is determined as a function of the speed of the vehicle and a further factor is determined as a function of the travel of the brake pedal experienced. To this end, the factors can each be stored independently in a characteristic curve. It is also possible to store the product of a plurality of such factors directly in a common characteristic curve diagram.

Further features of the present invention serve, on one hand, to prevent undesired triggering of the automatic braking process when the brake pedal is lightly touched and, on the other hand, to filter out small, rapid movements of the brake pedal which are produced even during constant braking by the driver. These movements are caused for example by the play of the brake pedal in the brake booster. In addition, the present invention contemplates criteria for terminating the automatic braking process. Switching off of the braking process must ensure termination when the driver wishes to finish braking or when the vehicle has come to a standstill.

BRIEF DESCRIPTION OF THE DRAWINGS

These and other objects, features and advantages and of the present invention will become more readily apparent from the following detailed description thereof when taken in conjunction with the accompanying drawings wherein.

DETAILED DESCRIPTION OF THE DRAWINGS

Figure 1:
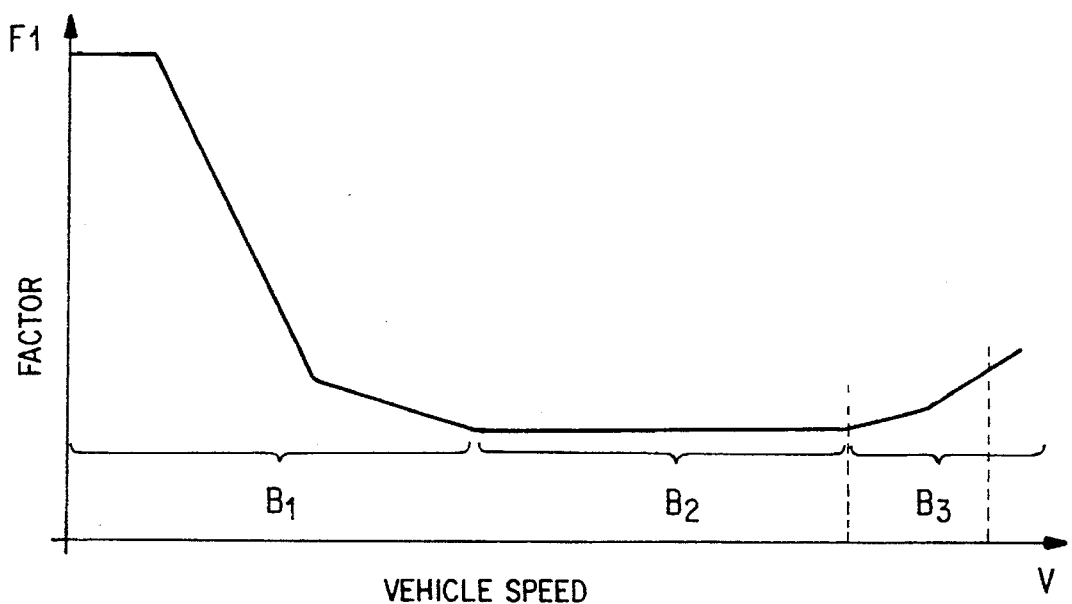
FIG. 1 shows the characteristic curve of a threshold multiplying factor as a function of the speed of the vehicle.

The characteristic curve in FIG. 1 represents the factor, F1, as a function of the speed, V, of the vehicle. The illustrated characteristic curve is given by a number of prescribed values of the factor, F1, for different speeds V. The intermediate values are then determined by linear interpolation..

In the range B1 of low speed, V, i.e., speeds below approximately 50 km/h, the characteristic curve has a maximum. Here, it is advantageous to select the factor F1 at speeds, V, below 5 to 10 km/h to be of such a size that it is not possible for the threshold value, Seff, to be exceeded. As a result, the automatic braking process is prevented from being triggered when maneuvering into a parking space or driving backwards as a result of violent actuation of the brake pedal because it is not a situation in which an automatic braking process is necessary. Subsequently, the characteristic curve of the factor F1 drops away. It is also, therefore, ensured that when driving in backed up traffic at a low speed and during stop-and-go driving the automatic braking process is exceeded at relatively high threshold values, Seff. The maximum of the factor, F1, assumes values between 2 and 5 for example, and the characteristic curve then drops away in this range to the value 1.

The range, B2, extends in the range of speeds which are customary for flowing traffic, i.e., in the range of speeds in the range of approximately 50 to 180 km/h. Here, the factor F1 has a minimum (e.g., a value 1) since the fixed threshold value, S1, is matched to customary actuation speeds, vB, of the brake pedal at these speeds.

Since the driver is basically inclined to actuate the brake pedal more violently, i.e., with higher actuation speeds, vB, at very high driving speeds, above approximately 180 km/h, the characteristic curve of the factor, F1, rises again in the range, B3. It rises for example to values of over 1.5 at speeds above 200 km/h.

Figure 2:
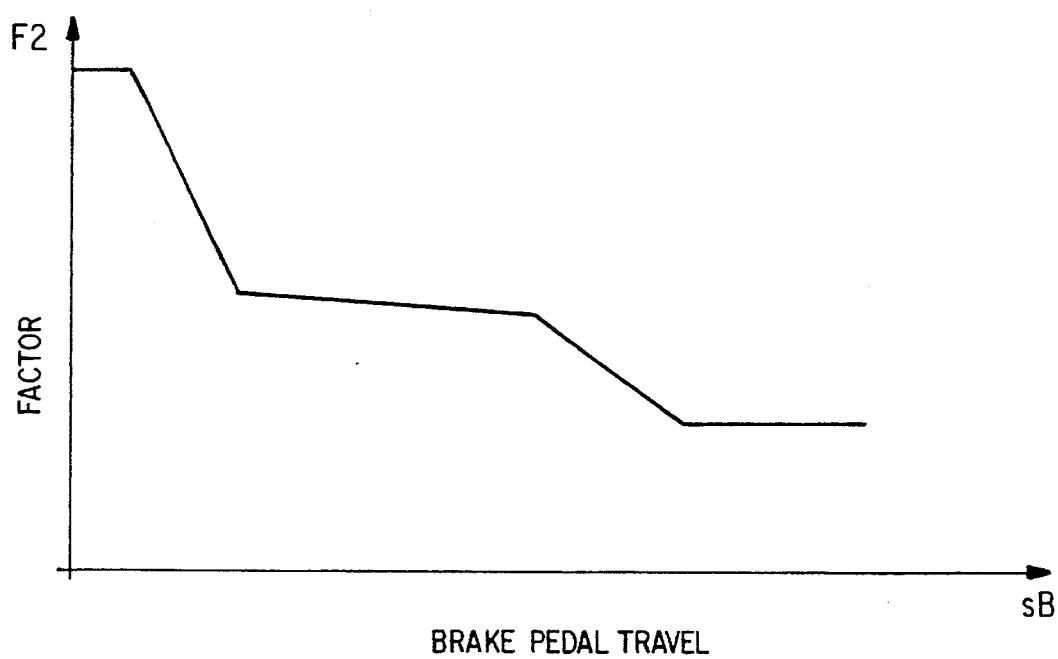
FIG. 2 Snows the characteristic curve of a factor as a function of the travel of the brake pedal.

FIG. 2 shows a characteristic curve for the factor, F2, which is determined as a function of the travel of the brake pedal experienced. This factor, F2, allows for the fact that it is no longer possible for the driver to reach such high actuation speeds, vB, of the brake pedal with continuing travel, sB, of the brake pedal, for example as a result of the pressure building up in the brake booster of the brake system. Here, it is important that with increasing travel, sB, of the brake pedal there is a phase shift in time between the current pedal travel and the decreasing factor, F2. This phase shift prevents braking which initially is at an actuation speed below the threshold value, Seff, from being evaluated too rapidly as actuation of the brakes triggering the automatic brake process, solely as a result of the continuing reduction of the factor, F2. This can be achieved, for example, by a filter which is only effective in the case of increasing travel, sB, of the brake pedal. When the pedal is released, this filter does not operate in order to have the correct travel value, sB, for connection into the system when the brake pedal is actuated again.

Figure 3:
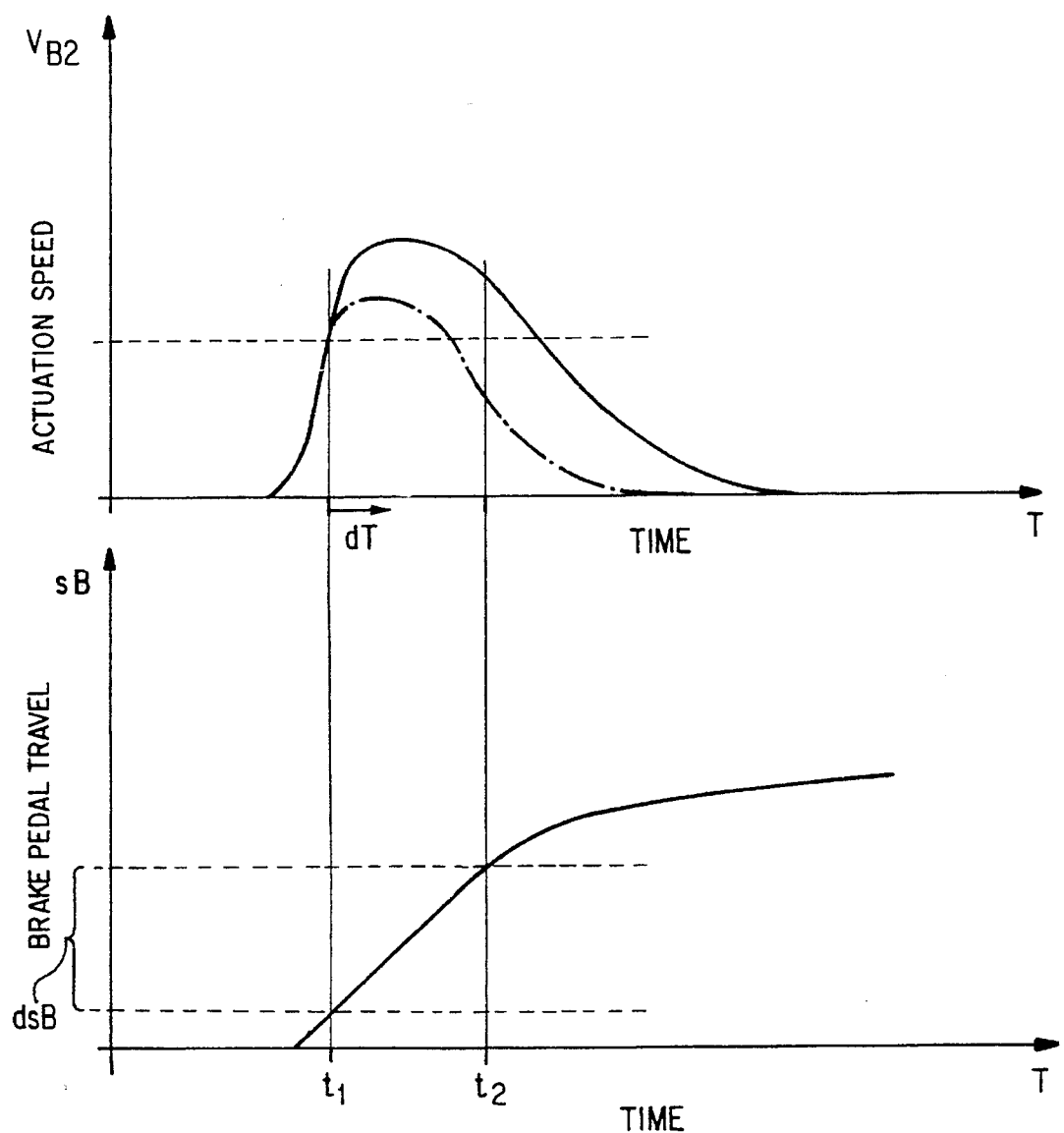
FIG. 3 shows examples for the curve of the actuation speed of the brake pedal in the course of braking.

FIG. 3 shows in the upper graph examples of the variation of the actuation speed, vB, as a function of time. The dot-dash line shows the variation of the actuation speed, vB, when the pedal is lightly touched or in the case of a small, rapid movement of the brake pedal, such as are carried out by a driver even in the case of constant braking. The solid line represents the variation in the case of violent braking during which the brake booster is to be connected in. In the lower graph of FIG. 3, the resulting curve of the travel, sB, of the brake pedal is plotted.

In order to ensure that an undesired automatic braking process is not initiated in the case of variations of the actuation speeds, vB, according to the dot-dash line curve of FIG. 3, monitoring occurs, starting from the time, t1, at which the threshold value, Seff, is exceeded, to determine whether or not the value drops below the threshold value, Seff, again or not. Monitoring takes place until the brake pedal has exceeded the travel threshold, dsB. In the illustrated embodiment, this takes place at the time, t2. In the case of the variation of the actuation speed shown by a dot dash line, the value drops beforehand below the threshold value, Seff, and therefore the automatic braking process is not initiated. In the case of the curve shown by the solid line, the value of the actuation speed does not drop below the threshold value, Seff, before the travel threshold, dsB, is passed through and the automatic braking process is triggered at the time, t2.

Figure 4:
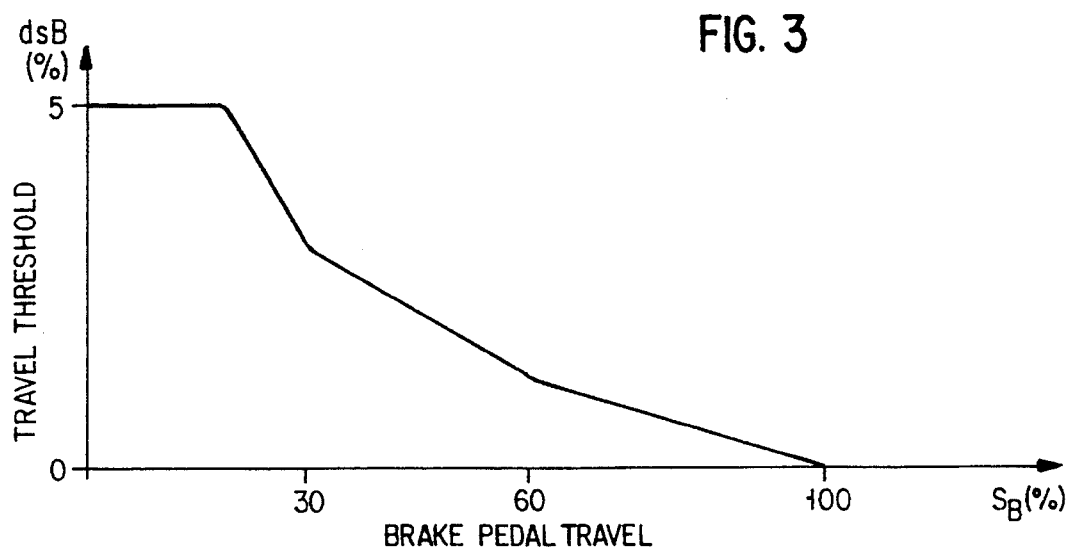
FIG. 4 shows the characteristic curve for the travel threshold which is dependent on the travel of the pedal.

FIG. 4 shows a characteristic curve for the travel threshold, dsB, as a function of the travel, sB, of the brake pedal experienced. The threshold decreases as the travel of the brake pedal increases. This allows, among other things, as the brake pedal is actuated more strongly for a decrease in the fluctuations in the travel, sB, of the brake pedal applied to the pedal by the driver when uniform braking is desired. At the same time, the travel threshold, dsB, is to be selected to be as small as possible since when an automatic braking process is required the deceleration which takes place as a result of the monitoring section of the travel of the brake pedal experienced must be minimized in the case of activation. The ratio of the travel, sB, of the brake pedal experienced to the maximum travel of the brake pedal experienced which is dependent on the geometry of the vehicle is entered, expressed as a percentage, as the abscissa value. The travel threshold, dsB, is expressed on the ordinate as a ratio, in the form of a percentage, to the maximum pedal travel.

Figure 5:
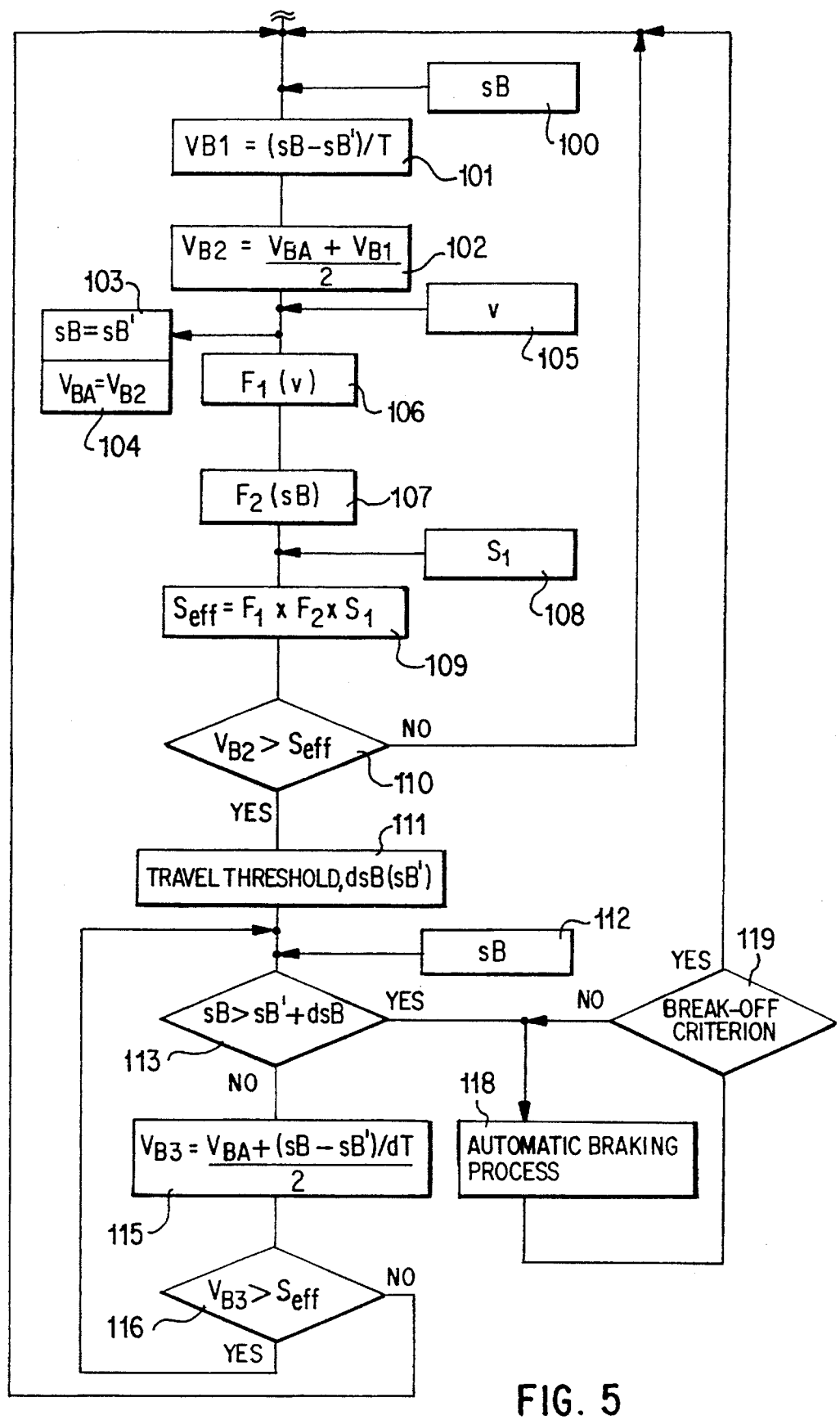
FIG. 5 shows the flow diagram of a method for carrying out an automatic braking process.

FIG. 5 is a flow diagram of a method for the activation of an automatic braking process in accordance with the present invention. The measured travel, sB, of the brake pedal is transmitted to the control in step 100. The actuation speed is determined therefrom in steps 101 and 102. In step 101, the speed value, vB1, is determined by the difference between the value, sB, which has been determined and the value, sB', which has been determined during the previous measurement, of the travel, sB, of the brake pedal being divided by the time, T, which has passed in the meantime and corresponds, in the case of a clocked method, to the method cycle time. In order to obtain a filter, an average is formed between this value, vB1, and the value, vBA, calculated during the previous determination. The actuation speed value, vB2, is obtained and stored in memory in step 104 as a new actuation speed value, vBA. In step 103, the measured travel, sB, of the brake pedal is stored in memory as a new value, sB'.

In step 106, the speed-dependent factor, F1, is determined from the characteristic curve on the basis of the speed, V, of the vehicle transferred in step 105. In step 107, the pedal travel-dependent factor, F2, is determined from the characteristic curve. In step 108, the stored fixed threshold value, S1, is called up. In step 109, the threshold value, Seff, is determined as the product of factors F1, F2 and S1.

As an alternative embodiment of the foregoing method, the pedal travel can also be read in repeatedly in a subordinate loop during a main clock, T, and processed (or filtered). This can take place three to four times with a main clock period of T=12 ms. In this way, more accurate values of the actuation speed, vB, are obtained.

In step 110, it is determined whether the current actuation speed, vB2, is above the threshold value, Seff. If it is not, the system returns to the start of the program. If a threshold value has been exceeded, in step 111 the travel threshold, dsB, is determined from the characteristic curve.

In step 112, a new result of the measurement of the travel path is taken over as the travel, sB, of the brake pedal. The steps 115 and 116 are carried out as long as it is determined in step 113 that this travel, sB, of the brake pedal is smaller than the sum of the travel, sB', of the brake pedal and the travel threshold, dsB.

In step 115, an actuation speed, vB3, is determined as the average value of the pedal speed value, vBA, and quotient formed from the difference between the brake pedal travel values, sB and sB', and the time interval, dT.

The time interval, dT, is the time which has passed since it was detected that the threshold value had been exceeded in step 110. Instead of the simple formation of an average value, a weighted mean can also be calculated, the greater weight then being assigned to the actuation speed value, vBA. In step 116, it is tested whether the actuation speed value vB3 still lies above the threshold value, Seff. If that value is not still above the threshold value, the system jumps back to the start of the program. If it still is above the threshold value, the system jumps back to step 112 and a new travel, sB, of the brake pedal is read in.

If it is then detected in step 113 that the travel, sB, of the brake pedal is greater than the sum of the travel, sB', of the brake pedal and the travel threshold, dsB, the automatic braking process 118 is carried out, which braking process is described in DE 40 28 290 C1. The automatic braking process lasts until a break-off criterion is fulfilled. This break-off criterion interrogation is carried out in step 119. If a break-off criterion is fulfilled, a jump back to the start of the program takes place. If a break-off criterion is not fulfilled, the jump takes place to step 118, the automatic braking process is carried on.

For example, the speed, V, of the vehicle and the actuation force, Kb, applied to the brake pedal 10 by the driver can serve as break-off criteria. The travel, sB, of the brake pedal can also be used. These criteria can be connected to one another both by AND operations and by OR operations.

With the speed limit, Gv, it is tested whether the vehicle has not almost virtually come to a standstill. In the case of a stationary vehicle, the automatic braking process is not to be carried out. Therefore, it is tested whether the speed of the vehicle is below for example 5 km/h. It is appropriate to connect this interrogation with an OR operation with a further criterion. Then, the braking process is terminated in any case if the vehicle is virtually stationary. The automatic braking process can, however, also be terminated before the speed drops below the speed threshold.

Figure 6:
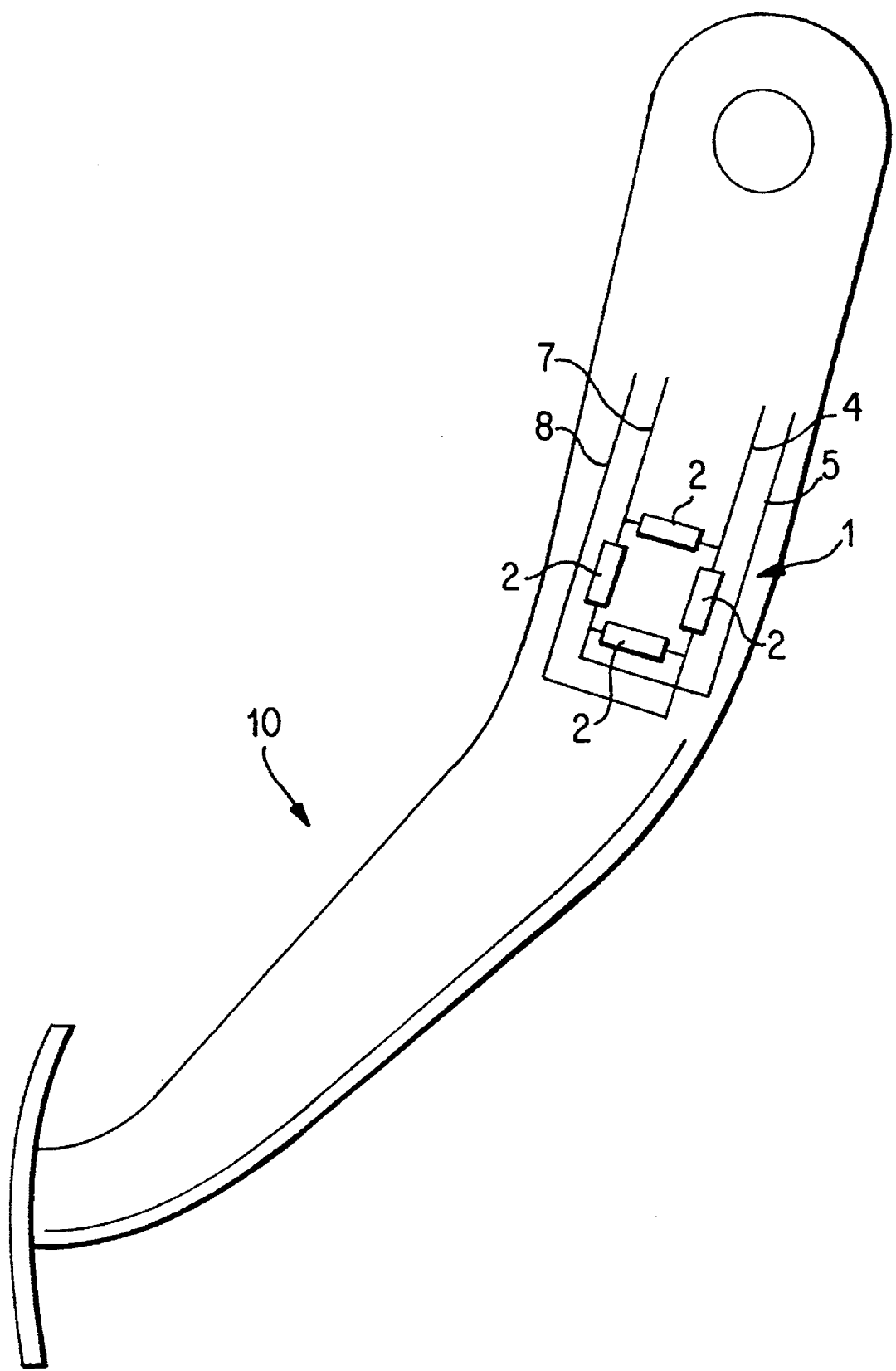
FIG. 6 shows a brake pedal with a force measuring device.

It is possible to determine as a further criterion whether the actuation force, Kb, which acts on the brake pedal 10 drops below a limit value, Ks. The force, Kb, should drop below this threshold just before the brake pedal is released and it lies for example between 20 and 40N. FIG. 6 shows a brake pedal 10 on which a plurality of wire strain gauges 2 are arranged as a force measuring device 1. The wire strain gauges 2 permit temperature compensated detection of the actuation force, Kb, applied to the brake pedal. For this purpose, the voltage between lines 7 and 8 is determined, the supply of current and the ground being provided by lines 3 and 4.

Generally, it is also possible to use, instead of the actuation speed of the brake pedal, variables which are directly dependent thereon, as single triggering criterion for an automatic braking process. The time derivative of the force which acts on the brake pedal or the time derivative of the brake pressure are considered appropriate variables.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for triggering an automatic braking process in a vehicle, comprising the steps of determining a threshold value of a brake pedal actuation speed by multiplying a fixed threshold value by at least one factor which is a function of a variable representative of a vehicle driving state, and using the threshold value as a single switch-on criterion for triggering of the automatic braking process, wherein a brake pressure which is greater than that which results from a brake pedal position is built up automatically after the automatic brake process is triggered.

2. The method according to claim 1, wherein the dependence of the at least one factor on the driving state variable is defined by a characteristic curve.

3. The method according to claim 2, wherein the characteristic curve for the at least one factor has lowest values in a first vehicle speed range of the speed of the vehicle, starting from a maximum value, has decreasing values in a second vehicle speed range, which is below the first vehicle speed range as vehicle speed increases and has rising values in a third vehicle speed range adjoining the first vehicle speed range which is central to the second and third vehicle speed ranges.

4. The method according to claim 3, wherein the driving state variable is the speed of the vehicle.

5. The method according to claim 2, wherein the characteristic curve for the at least one factor with increasing travel of the brake pedal experienced has values which drop as far as a minimum value which is greater than zero.

6. The method according to claim 5, wherein the driving state variable is the travel of the brake pedal experienced.

7. The method according to claim 1, wherein the driving state variable is the speed of the vehicle.

8. The method according to claim 1, wherein the driving state variable is the travel of the brake pedal experienced.

9. The method according to claim 1, wherein the threshold value is determined from multiplication of the fixed threshold value by two factors which are determined as a function of variables representing the driving state of the vehicle.

10. The method according to claim 9, wherein one of the factors is determined as a function of the speed of the vehicle, and the second of the factors is determined as a function of travel of the brake pedal experienced.

11. The method according to claim 1, wherein, at a point in time when the threshold value is exceeded, the travel of the brake pedal experienced at this point in time is determined, a travel threshold is determined as a function of the travel of the brake pedal, and the automatic braking process iS only triggered when the actuation speed of the brake pedal does not drop below the threshold value in a time period in which the brake pedal is moved on out of the travel of the brake pedal by the travel threshold.

12. The method according to claim 11, wherein a size of the travel threshold decreases as the travel of the brake pedal experienced increases.

13. A method for determining a switch-off criterion for an automatic braking process triggered in accordance with the method of claim 1, in which an automatic braking process is initiated after the switch-on criterion is fulfilled wherein an actuation force applied to the brake pedal is determined by a force measuring device, and the automatic braking process is terminated when the actuation force drops below a prescribed threshold value.

14. The method according to claim 13, wherein wire strain gauges operatively associated with the brake pedal comprise the force measuring device for measuring the actuation force.

15. The method according to claim 13, wherein the prescribed threshold value is in a range between 20 and 40 N.

16. A method for an automatic braking process in a vehicle, comprising the steps of determining a threshold value of brake pedal actuation speed in which a fixed threshold value is prescribed, determining travel of the brake pedal experienced when the fixed threshold value is exceeded, determining a travel threshold as a function of the travel of the brake pedal experienced, and triggering the automatic braking process only when the actuation speed of the brake pedal does not drop below the fixed threshold value in the time period in which the brake pedal is moved beyond the travel of the brake pedal by the travel threshold.

17. The method according to claim 16, wherein a size of the travel threshold decreases as the travel of the brake pedal experienced increases.

18. A method for determining a switch-off criterion for an automatic braking process triggered in accordance with the method of claim 16, in which an automatic braking process is initiated after the switch-on criterion is fulfilled, wherein an actuation force applied to the brake pedal is determined by a force measuring device, and the automatic braking process is terminated when the actuation force drops below a prescribed threshold value.

19. The method according to claim 18, wherein wire strain gauges operatively associated with the brake pedal comprise the force measuring device for measuring the actuation force.

20. The method according to claim 18, wherein the prescribed threshold value is in a range between 20 and 40 N.

21. A method for determining a switch-off criterion for an automatic braking process in a vehicle, comprising the steps of triggering an automatic braking process after a switch-on criterion is fulfilled, building up a braking pressure, during the automatic braking process which is greater than a pressure resulting from brake pressure actuation, and terminating the automatic braking process when a speed of the vehicle drops to a value above zero and below a limit value.

22. The method according to claim 21, wherein in the limit value is in a range between 3 and 5 km/h.

23. The method according to claim 21, wherein the triggering of the automatic braking process takes place by the steps of determining a threshold value of brake pedal actuation speed by multiplying a fixed threshold value by at least one factor which is a function of a variable representative of a vehicle driving state, using the threshold value as a single switch-on criterion for triggering of the automatic braking process, wherein a brake pressure which is greater than that which results from a brake pedal position being built up automatically after the automatic brake process is triggered and the fixed threshold value being prescribed for the brake pedal actuation speed.

24. The method according to claim 21, wherein the triggering of the automatic braking process takes place by the steps of determining a threshold value of brake pedal actuation speed in which a fixed threshold value is prescribed, determining travel of the brake pedal experienced when the fixed threshold value is exceeded, determining a travel threshold as a function of the travel of the brake pedal experienced, and triggering the automatic braking process only when the actuation speed of the brake pedal does not drop below the fixed threshold value in the time period in which the brake pedal is moved beyond the travel of the brake pedal by the travel threshold.

25. The method according to claim 21, wherein the triggering of the automatic braking process takes place by the steps of determining a switch-off criterion for an automatic braking process in which an automatic braking process is initiated after the switch-on criterion is fulfilled, wherein an actuation force applied to the brake pedal is determined by a force measuring device, and the automatic braking process is terminated when the actuation force drops below a prescribed threshold value.

* * * * *